(12) United States Patent
Muñiz Casais (10) Patent No.: US 9,742,229 B2
(45) Date of Patent: Aug. 22, 2017

(54) PERMANENT MAGNET ROTOR

(71) Applicant: ALSTOM RENEWABLE TECHNOLOGIES, Grenoble (FR)

(72) Inventor: César Muñiz Casais, Taradell (ES)

(73) Assignee: ALSTOM Renewable Technologies, Grenoble (FR)

( * ) Notice: Subject to any disclaimer, the term of this patent is extended or adjusted under 35 U.S.C. 154(b) by 195 days.

(21) Appl. No.: 14/411,069

(22) PCT Filed: Jun. 28, 2013

(86) PCT No.: PCT/EP2013/063650
§ 371 (c)(1),
(2) Date: Dec. 23, 2014

(87) PCT Pub. No.: WO2014/001512
PCT Pub. Date: Jan. 3, 2014

(65) Prior Publication Data
US 2015/0194850 A1    Jul. 9, 2015

Related U.S. Application Data

(60) Provisional application No. 61/694,575, filed on Aug. 29, 2012.

(30) Foreign Application Priority Data

Jun. 29, 2012   (EP) .................................... 12382260

(51) Int. Cl.
*H02K 21/12* (2006.01)
*H02K 1/27* (2006.01)
(Continued)

(52) U.S. Cl.
CPC .......... *H02K 1/2766* (2013.01); *F03D 9/002* (2013.01); *H02K 1/28* (2013.01); *H02K 1/32* (2013.01);
(Continued)

(58) Field of Classification Search
CPC ......... H02K 1/2766; H02K 1/276; H02K 1/02
(Continued)

(56) References Cited

U.S. PATENT DOCUMENTS 5,159,220 A * 10/1992 Kliman ................ H02K 1/2766
310/156.56
8,564,168 B2 * 10/2013 Chamberlin ......... H02K 1/2766
310/156.53
(Continued)

FOREIGN PATENT DOCUMENTS

CN          1822474 A      8/2006
EP         2 085 982       8/2009
(Continued)

OTHER PUBLICATIONS

Chinese Office Action, dated Jun. 20, 2016.
EP Office Action, dated Mar. 16, 2017.

*Primary Examiner* — Thanh Lam
(74) *Attorney, Agent, or Firm* — Dority & Manning, P.A.

(57) ABSTRACT

A permanent magnet rotor comprises a rotor body configured for rotating around a central rotational axis and further comprises principal permanent magnets that are substantially rectangular in axial cross-section and are embedded in the rotor body and are arranged inclined with respect to the radial plane extending through the center of the principal magnets and such as to have a circumferential magnetic orientation. The principal magnets have an inner end and an outer end, the outer end being arranged in the proximity of the air gap of the outer circumference of the rotor, and outer bridges of magnetically conductive material being formed between the outer ends of the principal magnets and the outer circumference of the rotor. Auxiliary magnets are arranged near the outer ends of the principal magnets to magnetically saturate the outer bridges.

20 Claims, 9 Drawing Sheets

(51) Int. Cl.
*F03D 9/00* (2016.01)
*H02K 1/28* (2006.01)
*H02K 1/32* (2006.01)
*H02K 7/18* (2006.01)

(52) U.S. Cl.
CPC ....... *H02K 7/1838* (2013.01); *H02K 2213/12* (2013.01); *Y02E 10/725* (2013.01)

(58) Field of Classification Search
USPC ............. 310/156.53, 156.56, 156.01–156.84
See application file for complete search history.

(56) References Cited

U.S. PATENT DOCUMENTS

| | | | |
|---|---|---|---|
| 2003/0164655 A1 | 9/2003 | Biais et al. | |
| 2005/0200223 A1* | 9/2005 | Tajima | H02K 1/2766 310/156.46 |
| 2007/0126305 A1* | 6/2007 | Okuma | H02K 1/276 310/156.53 |
| 2008/0231135 A1* | 9/2008 | Suzuki | H02K 1/2766 310/156.53 |
| 2008/0265706 A1* | 10/2008 | Nakayama | H02K 1/2766 310/156.53 |
| 2011/0062814 A1* | 3/2011 | Adaniya | H02K 1/276 310/156.53 |
| 2011/0273040 A1 | 11/2011 | Chamberlin et al. | |
| 2012/0133230 A1 | 5/2012 | Jansen | |
| 2012/0194026 A1* | 8/2012 | Matsuoka | H02K 1/2766 310/156.53 |
| 2013/0119810 A1* | 5/2013 | Aoyama | H02K 21/145 310/156.53 |
| 2014/0091664 A1* | 4/2014 | Aoyama | H02K 1/274 310/156.53 |

FOREIGN PATENT DOCUMENTS

| | | |
|---|---|---|
| JP | H 08-336269 A | 12/1996 |
| WO | WO 2008/107512 | 9/2008 |

\* cited by examiner

PERMANENT MAGNET ROTOR

This application claims the benefit of European Patent Application 12 382 260.3 filed 29 Jun. 2012 and U.S. Provisional Patent Application Ser. No 61/694,575 filed 29 Aug. 2012.

The present disclosure relates to a permanent magnet rotor for an electrical machine. The present disclosure also relates to a permanent magnet generator rotor especially suitable for a wind turbine, and to a wind turbine comprising such a permanent magnet generator rotor.

BACKGROUND ART

Electrical machines, such as motors and generators having a rotor with permanent magnets are known. They are generally deemed to be reliable and require less maintenance than other generator topologies.

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox. Particularly for offshore wind turbines, direct drive systems employing permanent magnets are usually chosen.

Such a direct drive wind turbine generator may have e.g. a diameter of 6-8 meters and a length of e.g. 2-3 meters. Hundreds of magnets may need to be attached, e.g. by screwing or gluing to the circumference of the rotor. It will be clear that this manufacturing process can be cumbersome.

Furthermore, if one or more magnets is damaged and needs to be replaced, the access to these magnets can be complicated (especially with large size generators), such that maintenance can become very expensive.

The permanent magnets may be made e.g. from AlNiCo steel (Aluminium-Nickel-Cobalt) or rare earth magnetic materials such as neodymium (NdFeB), or samarium-cobalt. These materials may be relatively expensive. For this reason, it is important that the permanent magnets have the minimum size required and that loss of magnetic flux of the permanent magnets of the rotor is reduced to a minimum.

Cooling of the components is generally an important requirement in electrical machines. A cooling air flow may be established by the rotation of the rotor. In some implementations, an additional cooling air flow may be provided by a dedicated fan. Furthermore, in some implementations a liquid cooling circuit may be provided. Incorporation of a cooling circuit may further complicate the assembly and manufacture of large permanent magnet generators. A plurality of radial cooling holes may need to be drilled. These radial holes may complicate manufacture and assembly and will generally not lead to homogeneous cooling.

This size and type of generator however is not limited to offshore applications, and not even to the field of wind turbines only. Generators of considerable dimensions that may suffer from the same problems and/or have the same complications may also be found e.g. in steam turbines and water turbines. Also relatively large permanent magnet motors may have the same or similar problems.

SUMMARY OF THE INVENTION

In a first aspect, the present invention provides a permanent magnet rotor for an electrical machine having a stator and a rotor and an air gap arranged between the outer circumference of the rotor and the outer circumference of the stator. The rotor has a rotor body configured for rotating around a central rotational axis and further comprises principal permanent magnets that are substantially rectangular in axial cross-section and are embedded in the rotor body and are arranged inclined with respect to the radial plane extending through the centre of the principal magnets and such as to have a circumferential magnetic orientation. The principal magnets have an inner end and an outer end, the outer end of the magnet being arranged in the proximity of the air gap of the outer circumference of the rotor, and outer bridges of magnetic material being formed between the outer ends of the principal magnets and the outer circumference of the rotor, and auxiliary magnets are arranged near the outer ends of the principal magnets to magnetically saturate the outer bridges.

In this aspect of the invention, the arrangement of the magnets inclined with respect to the local radial plane lead to beneficial power and torque characteristics. Additionally, loss of magnetic flux is minimized by the magnetic saturation of the outer bridges between the principal magnets and the outer circumference of the rotor provided by the magnetic field generated by the auxiliary magnets. The magnetic flux of the permanent magnets is thus all directed from the rotor to the stator.

Herein, axial cross-section may be defined as the cross-section with a plane that is perpendicular to the rotational axis of the rotor. An axial direction may be defined as a direction coinciding with the rotational axis of the rotor or parallel thereto.

The outer circumference of the rotor may be defined as the circumference of the rotor delimiting the air gap between rotor and stator. In this sense, the rotor may either surround the stator or the stator may surround the rotor.

In some embodiments, the auxiliary magnets may be made from a different material than the principal magnets. The material of the auxiliary magnets may be cheaper than the material used for the permanent magnets.

In some embodiments, inner bridges of magnetic material may be formed between the inner ends of the principal magnets and portions of non-magnetic material, and wherein auxiliary magnets are arranged near the inner ends of the principal magnets to magnetically saturate the inner bridges. In these embodiments, the loss of magnetic flux may be further reduced.

In some embodiments, the rotor body may comprise a rim and a plurality of permanent magnet modules arranged on the outer or inner circumference of the rim, wherein each of the permanent magnet modules extends generally along an axial direction and being of substantially constant axial-cross-section, and has a base adapted to be fixed to the rim, and one or more axial rows of permanent magnets and rows of auxiliary magnets, and one or more pole pieces. In these embodiments using modules, assembly and maintenance is facilitated. Both for repair and manufacture, modules of magnets can be relatively easily inserted in place and removed. In alternative embodiments, the permanent magnets may be embedded in a more solid rotor core that extends from a shaft to an outer circumference (in case the stator surrounds the rotor).

In some embodiments, one or more of the permanent magnet modules may comprise two axial rows of principal magnets. All the modules may be substantially mechanically identical, i.e. they may be identical but for the magnetization of the magnets. The assembly of the generator rotor may thus be simplified. In other embodiments, four axial rows of principal magnets may be included in each of the modules.

In these cases, the modules may be substantially identical. In alternative embodiments, modules with a single row of permanent magnets may be used. Not all modules are necessarily identical in this configuration. The axial rows of magnets may include, a single magnet, or two or more magnets axially positioned behind each other.

In some embodiments, the base and pole pieces of the permanent magnet modules may be integrally formed and the magnets may be embedded in the permanent magnet modules. If the base and pole pieces are integrally formed (i.e. they form a monolithic piece) in axial cross-section, the manufacturing tolerances for the modules may be reduced.

In some embodiments, the rotor may comprise a plurality of anchors for fixing the permanent magnet modules to the rotor rim, wherein the permanent magnet modules comprise a base having a bottom surface adapted to be fit to the inner or outer circumference of the rotor rim, and two axially extending side surfaces, and the two side surfaces of the base of the permanent magnet modules each comprise an axially extending groove, and wherein the anchors have a shape that fits in axially extending grooves of neighbouring permanent magnet modules. Optionally, these anchors may be substantially T-shaped.

In these embodiments, a particularly easy way of installing the modules on the rotor rim is provided. The anchors may first be loosely attached to the rotor rim. After placement of the module, the anchor may be tightened and may engage with the base of the module.

In yet a further aspect, the disclosure provides a wind turbine comprising a generator having a rotor substantially as hereinbefore described. In some implementations, the wind turbine may be a direct drive wind turbine. In particular, the wind turbine may be an offshore direct drive wind turbine. In other implementations, the wind turbine could comprise a drive train with a gearbox.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1A:
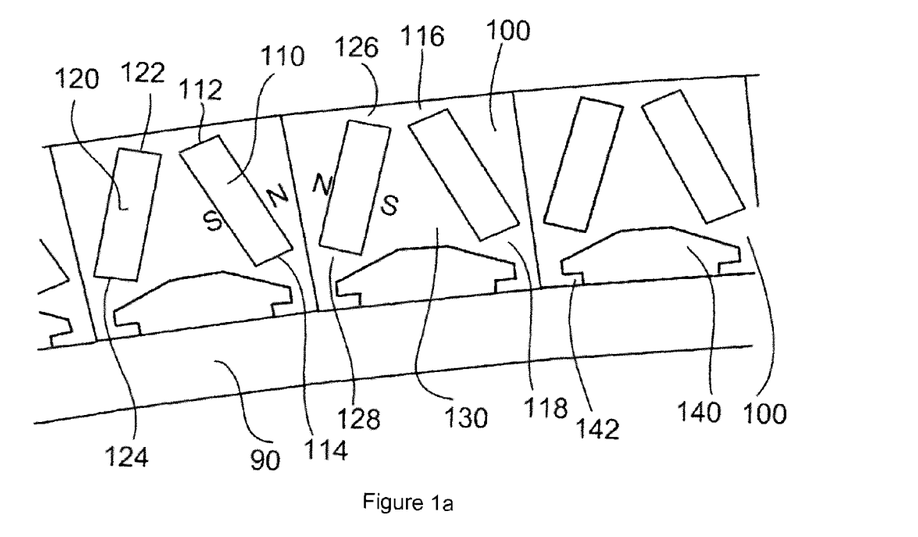
FIGS. 1a-1c illustrate an electrical machine with a permanent magnet rotor in which embodiments of the invention may be incorporated.

FIG. 1a schematically illustrates an outer edge region of a permanent magnet rotor of an electrical machine, e.g. a generator of a wind turbine. The rotor in this example may comprise a rim 90 and a plurality of modules 100 attached to the radially outer circumference of the rim 90. The use of modules may facilitate assembly and repair, particularly of large generators, such as generators that may be found on direct drive wind turbines.

Each module 100 may comprise a first and second principal permanent magnet 110 and 120 respectively arranged on a base 130. The base 130 has an upper portion with a substantially isosceles triangular cross-section with the permanent magnets arranged along the sides of the triangle.

The permanent magnets 110 and 120 are arranged to be inclined with respect to a local radial plane. The magnets have a circumferential magnetic orientation (also sometimes referred to as "transversal" or "tangential" orientation), i.e. the North and South of each of the magnets are arranged in the rotor next to each other in a circumferential (or "tangential") direction. With such an arrangement, the magnetic flux between a permanent magnet 110 of a first module, and a permanent magnet 120 of another module is concentrated towards the stator. This is further illustrated in FIG. 1c.

Figure 1B:
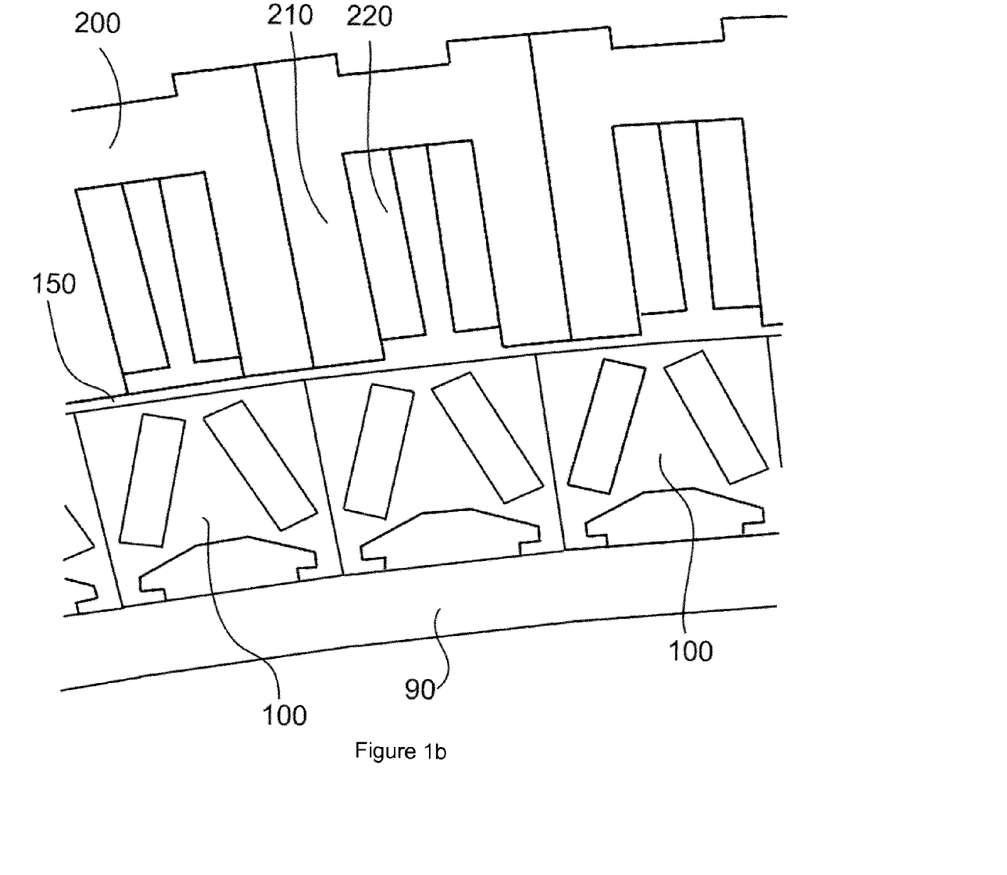
Figure 1C:
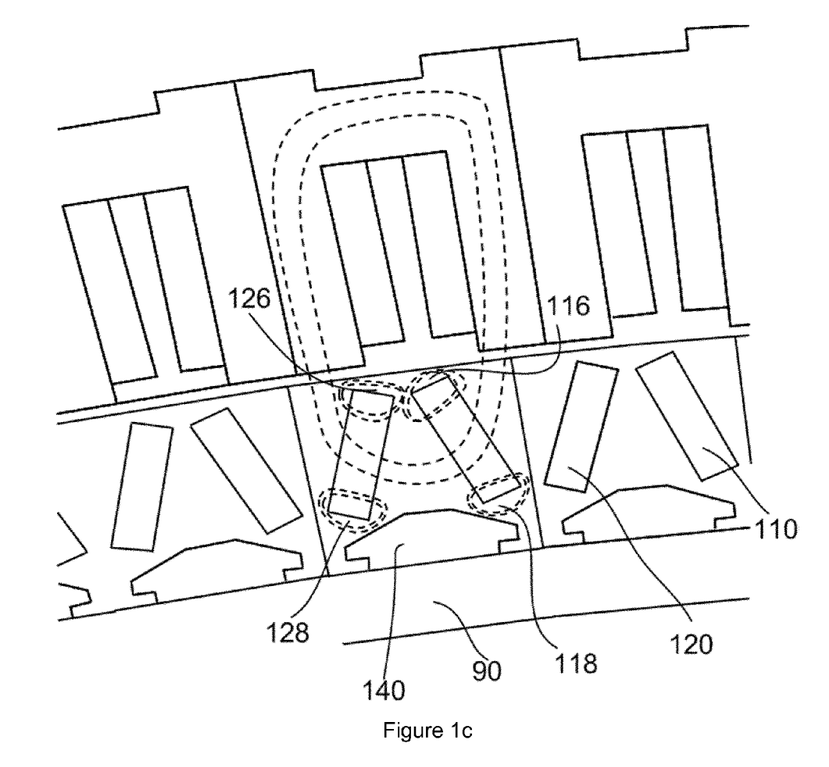

First principal magnet 110 extends between an inner end 114 and an outer end 112, the outer end being closer to the outer circumference of the rotor, i.e. the outer end is closer to the stator, as illustrated in FIGS. 1b and 1c. Second principal magnet 120 also comprises an inner end 124 and an outer end 122. Bridges 126 and 116 of (ferro)magnetic material are formed between the outer ends of the principal permanent magnets.

The permanent magnet module may be of substantially constant cross-section and may comprise a stack of metal sheets. The metal sheets of the stack may be welded stuck to each other, or may be joined e.g. by adhesives or by other mechanical means such as e.g. clamping bolts.

Such a laminated structure may reduce or avoid eddy currents. The metal sheets may be formed by punching or e.g. laser cutting and may be glued together. Rectangular through-holes may be formed in the metal sheets so as to embed the rectangular permanent magnets. These holes may also be formed e.g. by punching or by laser cutting. In alternative embodiments, instead of a stack of metal sheets, an integral piece could be used. Embedding the magnets in this way reduces the part count and as a result of the reduction of components that are to be assembled, tolerances may automatically decrease.

The magnets may be securely fixed using suitable adhesives. At both the front and the rear end, the magnets may be sealed from the outside using e.g. end plates and/or epoxy resin.

Each of the modules may be attached to the rotor rim 90 by means of an anchor 140. Legs 142 of the base of the modules 100 may be pressed between a portion of the anchor 140 and the rotor rim. The anchors may be made from a substantially non-magnetic material. Inner bridges 118 and 128 are formed between the inner ends 114 and 124 of the principal magnets and the non-magnetic anchors 140.

An air gap 150 is formed between the outer circumference of the rotor and the stator 200, see FIG. 1b. The stator may comprise a plurality of windings 220 wound around teeth 210. As the rotor rotates, the magnetic field generated by the permanent magnets causes a varying magnetic field in the windings, which causes an electrical current in the windings 220.

FIG. 1c illustrates a possible loss of magnetic flux along the inner bridges 118 and 128 and the outer bridges 116 and 126. The loss of magnetic flux is caused by magnetic flux lines from the principal magnet closing on the same magnets. Only the magnetic flux lines that reach the stator can provoke an electrical current. In this sense, the potential loss at the outer bridges tends to be more significant than the loss at the inner bridges.

Figure 2A:
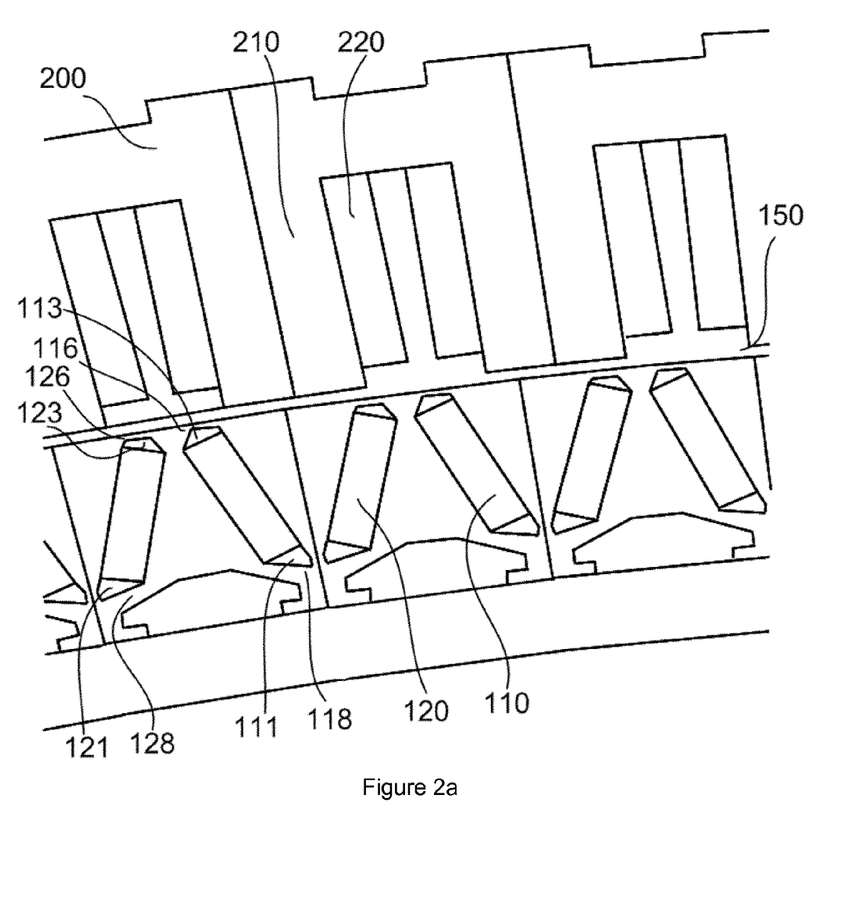
FIGS. 2a and 2b illustrate another electrical machine with a permanent magnet rotor in which embodiments of the invention may be incorporated.
Figure 2B:
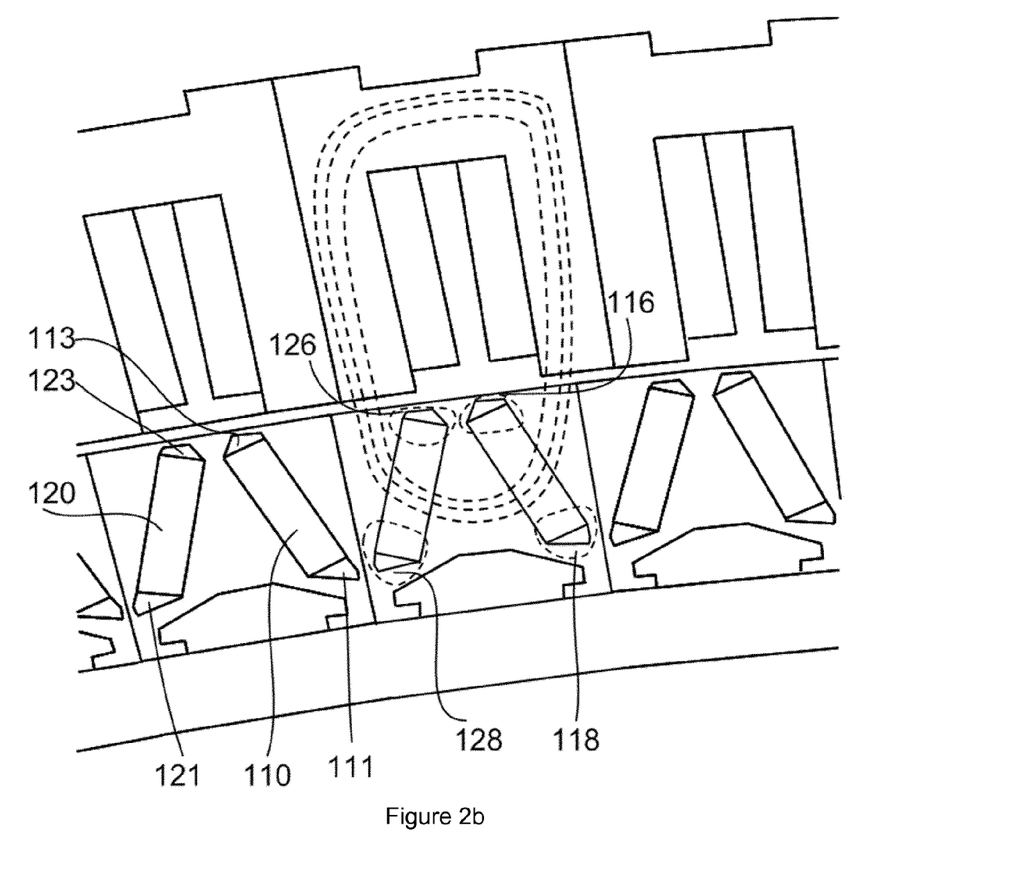

FIGS. 2a and 2b illustrate a similar electrical machine that suffers from similar problem. The most important difference with the previous electrical machine is the arrangement of cooling channels at the inner end outer ends of the principal magnets of the magnet module 100. An outer cooling channel 113 may be provided near an outer end portion 112 of magnet 110. An inner cooling channel 111 may be provided near an inner end portion 114 of magnet 110. Similarly, an outer cooling channel 123 and an inner cooling channel 121 may be provided at the ends of the magnet 120.

Cooling channels through which air may pass in operation serves to maintain the temperature of the rotor within an acceptable range. The incorporation of the cooling channels in the permanent magnet modules does not complicate manufacture and assembly.

A secondary effect of the incorporation of the cooling channels may be that the size of the outer and inner bridges may be reduced. A reduction of the size of the bridges may reduce the loss of magnetic flux. On the other hand, the loss of magnetic flux is hard to avoid completely, particularly at the outer bridges since material is needed at the outer end to hold the permanent magnets (as is schematically illustrated in FIG. 2b)

Figure 3:
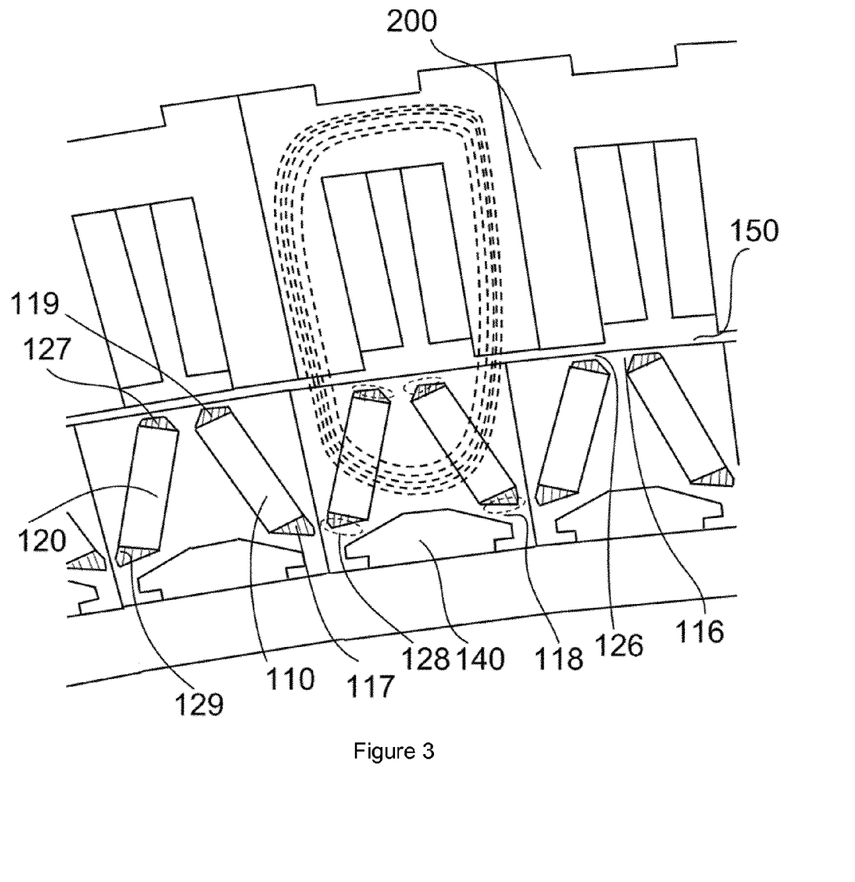
FIG. 3 illustrates an embodiment of the present invention.

FIG. 3 schematically illustrates an example of the present invention. Compared to FIG. 2, the cooling channels have been substituted by auxiliary magnets. In this example, at each end of magnet 110 and at each end of magnet 120, auxiliary magnets 117, 119, 127 and 129 may be provided. The auxiliary magnets serve to magnetically saturate the inner bridges 118, 128 and outer bridges 116 and 126. If the bridges are magnetically saturated, the magnetic flux of the permanent magnets is all directed towards the stator.

The principal magnets may be made e.g. from AlNiCo steel (Aluminium-Nickel-Cobalt), or rare earth magnetic materials such as neodymium (NdFeB), or samarium-cobalt. The auxiliary magnets may be made of a relatively cheap material, such as e.g. ferrite (ceramic materials with $Fe_2O_3$ as their principal component). The principal magnets may thus be made of materials having superior mechanic and/or magnetic characteristics. The dimensions of the principal magnets may be determined in accordance with the requirements of the generator (or motor), without taking into account any possible loss of magnetic flux. The auxiliary magnets may be sized and arranged with the mere goal of magnetically saturating the bridges, particularly the outer bridges. A cost-effective design of the permanent magnet rotor may thus be achieved.

Figure 4:
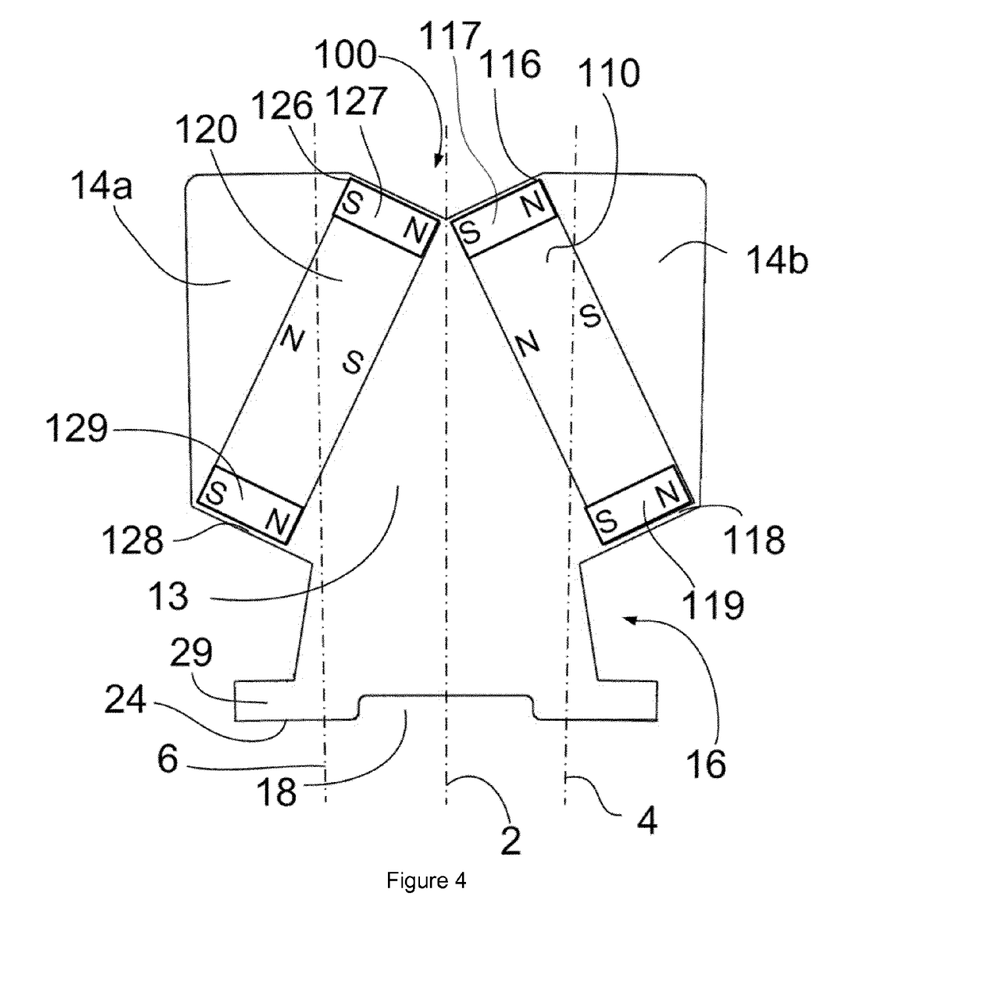
FIG. 4 illustrates an axial cross-section of a permanent magnet module in accordance with another embodiment of the present invention.

FIG. 4 illustrates an axial cross-section of a permanent magnet module in accordance with another embodiment of the present invention. Permanent magnet module 100 comprises a base 13, a first axial row of permanent magnets 110 and a second axial row of permanent magnets 120. The axial rows of magnets may be a single magnet, or a plurality of magnets axially positioned behind each other.

The North and South of the permanent magnets are indicated in FIG. 4. The magnetization of magnets in one module is the opposite to the magnetization of its neighbouring modules.

The magnets may be inclined towards a central radial plane 2 of the module. The magnets do not extend along the local radial planes 4 and 6 (the radial planes passing through the center of the magnets), but instead are inclined with respect to these planes, as illustrated in FIG. 4. The magnetic flux lines from the North of the second magnet 120 to the South of the first magnet 110 will be substantially straight, i.e. horizontal. The two magnets together may form a single pole, and the magnetic flux lines from the North of the first magnet to the South on the second magnet will enclose a winding arranged on the stator (not shown). Pole pieces 14a and 14b act as flux concentrators.

The permanent magnet module may be of substantially constant cross-section and may comprise a stack of metal sheets. The metal sheets of the stack may be welded stuck to each other, or may be joined e.g. by adhesives. Alternatively, the metal sheets may be mechanically joined together using e.g. clamp bolt.

Such a laminated structure may reduce or avoid eddy currents. The metal sheets may be formed by punching or e.g. laser cutting and may be glued together. Rectangular through-holes may be formed in the metal sheets so as to embed the rectangular permanent magnets. These holes may also be formed e.g. by punching or by laser cutting. In alternative embodiments, instead of a stack of metal sheets, an integral piece could be used. Embedding the magnets in this way reduces the part count and as a result of the reduction of components that are to be assembled, tolerances may automatically decrease.

The magnets may be securely fixed using suitable adhesive. At both the front and the rear end, the magnets may be sealed from the outside using e.g. end plates and/or epoxy resin.

The base 13 has an upper portion with a substantially isosceles triangular cross-section with the permanent magnets arranged along the sides of the triangle. The bottom of the base of the module may be adapted to fit on the inner or outer circumference of the rotor rim. The bottom 24 of the base may thus be slightly curved.

A weight saving recess 18 may be provided at the bottom. The side surfaces of the base may comprise grooves 16. The base 13 may comprise legs 29 forming the lower end of the grooves. Suitably shaped anchors may be used for fixing the permanent magnet modules to the rotor rim. The anchors may be of such shape that they engage with the surfaces of the grooves 16 (and legs 29) when fixed to the rotor rim.

To assemble the rotor, the anchors may be loosely attached at the circumference of the rotor rim. Then, the permanent magnet modules 10 may be inserted and slid between two neighbouring anchors. Then, to fix the magnet modules in place, the bolts of the anchors may be tightened, so that the anchors press a portion of the base against the circumference of the rotor rim.

In this aspect, a permanent magnet rotor is provided for which the assembly and maintenance is facilitated. Both for repair and manufacture, modules of magnets can be relatively easily inserted and removed. Friction between the magnets and rotor rim during installation and/or maintenance may be avoided.

Since the grooves in the side surfaces of the modules are substantially larger than the corresponding side portions of the anchors, a space remains between two modules. This space may serve for cooling.

The base 13 and pole pieces may e.g. be made from steel or another magnetically conducting material. Outer bridges 116, 126 of magnetically conducting material are formed between the outer ends of the principal magnets and the outer circumference of the rotor. Inner bridges 118, 128 of magnetically conducting material are formed between the inner ends of the principal magnets and magnetically non-conducting material (in this case air between two neighbouring modules of the rotor body).

In order to avoid magnetic flux of the principal magnets being lost, auxiliary magnets 117, 119, 127 and 129 are incorporated for magnetically saturating the bridges. In this case, the auxiliary magnets have a circumferential magnetic orientation just as the principal magnets. However, in order to magnetically saturate the bridges, the auxiliary magnets could also have a radial magnetic orientation.

Figure 5:
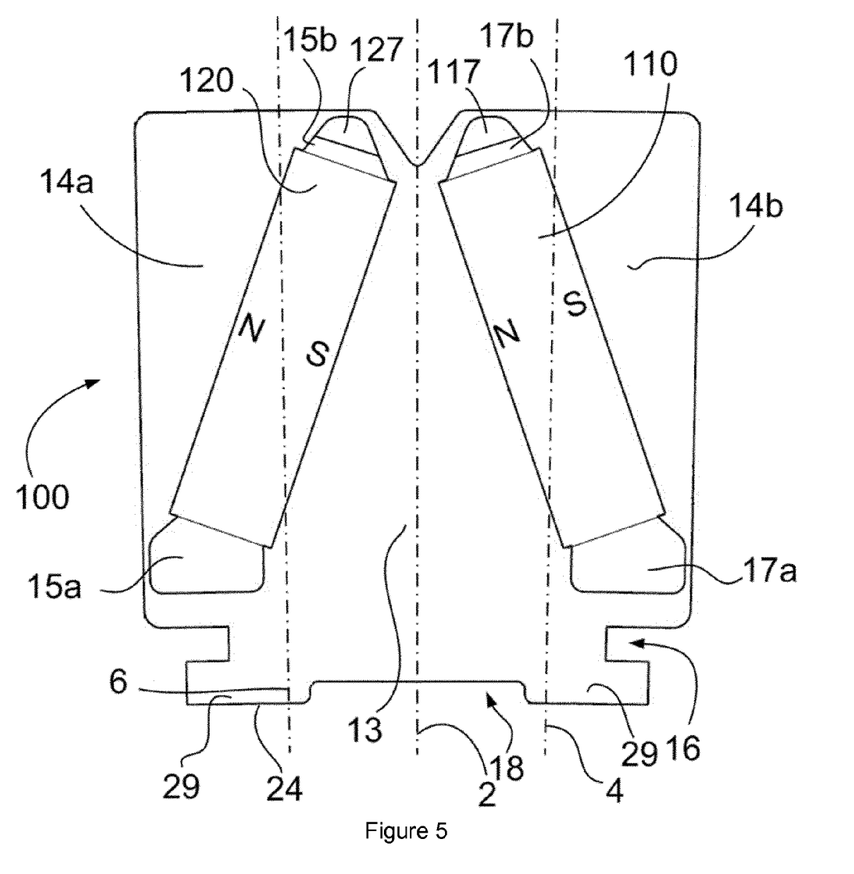
FIG. 5 illustrates an axial cross-section of a permanent magnet module in accordance with yet another embodiment of the present invention.

FIG. 5 schematically illustrates a cross-section of a permanent magnet module according to another embodiment. In this case, each module may comprise two rows of embedded permanent magnets which are inclined with respect to the local radial planes 4 and 6 and may be inclined towards a central radial plane 2, substantially similar to the embodiments illustrated in FIG. 4.

In this embodiment, an axially extending cooling channel 15a is provided at the foot (i.e. inner end) of the first magnet 11. Another cooling channel 15b is provided at the top (i.e. outer end) of magnet 120. Similar cooling channels 17a and 17b are provided at the foot and top of magnet 110 respectively. The cooling channels are incorporated in the module in this configuration, which facilitates the manufacture and assembly while assuring enough cooling.

The bottom 24 of the base comprises grooves 16, which in this case may be formed by straight cut-outs. The permanent magnets may be embedded in a similar way as described before. T-shaped anchors may sit substantially exactly in the grooves 16.

In this example, an auxiliary magnet 117 and an auxiliary magnet 127 may be arranged near the outer ends of the principal magnets to magnetically saturate the outer bridges. In this example, a cooling channel is thus provided between the principal magnets and the auxiliary magnets. The auxiliary magnets may have any required shape and may be formed by filling slots in the rotor core with bond magnet (plastic magnetic material), and the bond magnet can then be solidified. The introduction of the bond magnet in the slots may be done using injection moulding.

In alternative embodiments, one or more cooling channels may be provided in other positions near the principal magnets. In one example, an auxiliary magnet may surround a cooling channel.

Figure 6A:
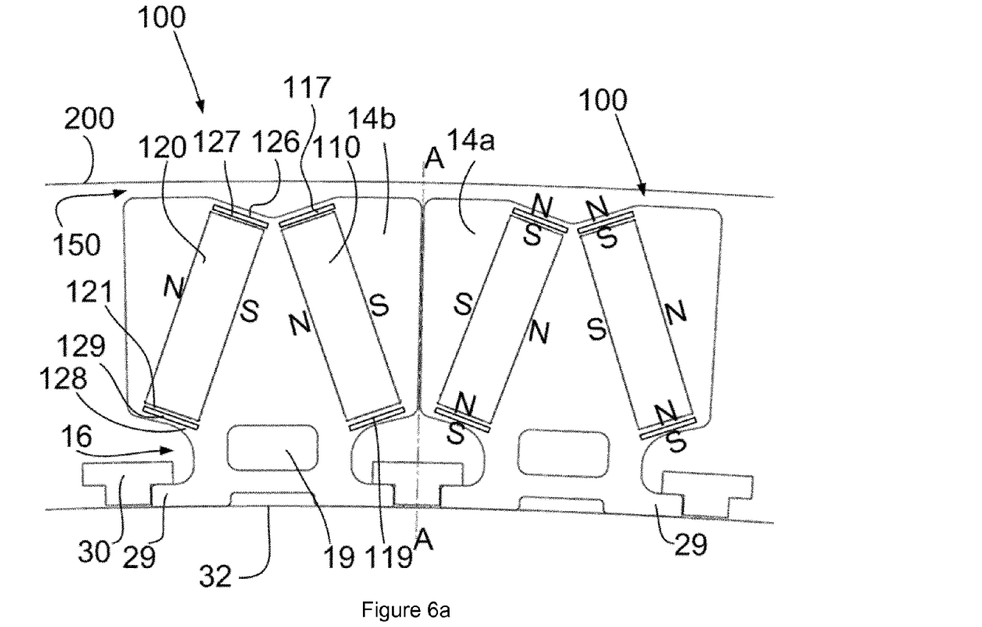
FIGS. 6a-6b schematically illustrate a rotor in accordance with further embodiments of the present invention.
Figure 6B:
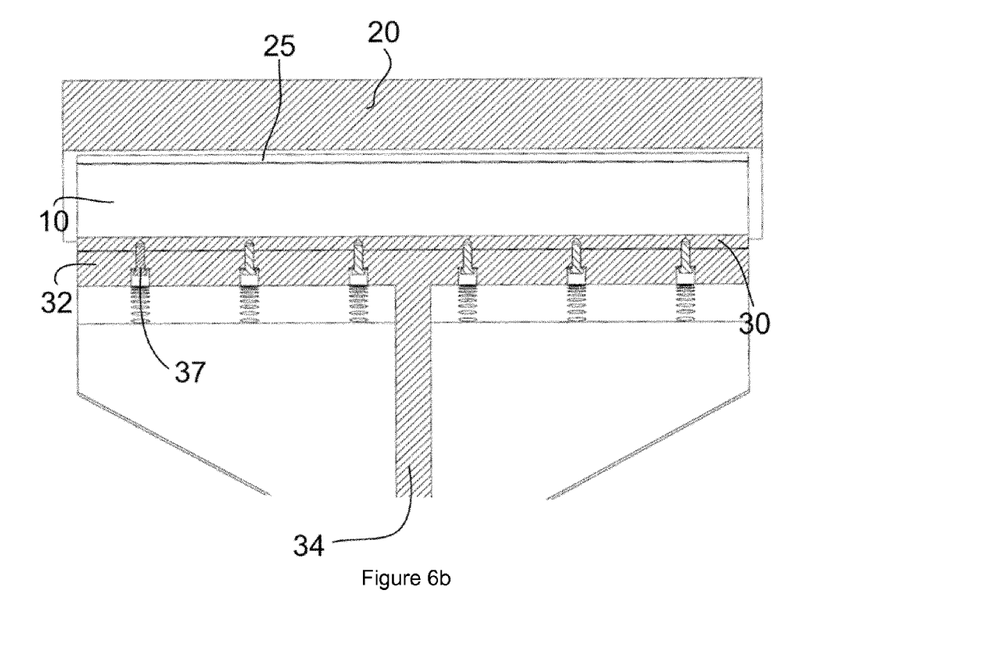

FIGS. 6a and 6b illustrate another embodiment in axial cross-section and in radial cross-section respectively.

FIG. 6a illustrates two permanent magnet modules installed on the rotor rim next to each other. Each of the modules 100 may comprise a first magnet 110 (or first row of magnets) and a second magnet 120 (or second row of magnets) which are rectangular and are inclined with respect to the local radial planes of the magnets.

The permanent magnet modules have a circumferential magnetic orientation. It may be seen that the magnetization of the magnets of one module is the opposite of the magnetization of the magnets of the neighbouring module. Pole pieces 14a and 14b may act as flux concentrators.

In alternative embodiments, the two neighbouring modules could be formed as a single module. Even more modules shown separately could be combined in a single module. The same applies to the examples illustrated in other figures.

Also illustrated in FIG. 6a are the stator 200 and the air gap 150 between rotor and stator. In this embodiment, the stator substantially surrounds the rotor. In other implementations, the rotor may surround the stator.

The permanent magnet modules may comprise a central cooling channel 19. The magnets may be embedded in the permanent magnet modules.

In this example, auxiliary magnets 117, 119, 127 and 129 that are radially magnetized are provided to magnetically saturate the outer bridges 126 and 128. In the example shown, the auxiliary magnets may be physically separated from the principal magnets, i.e. a portion of magnetically conductive material is arranged between the principal magnets and auxiliary magnets. This portion could potentially be a source of a loss of magnetic flux, so that the auxiliary magnets need to magnetically saturate these portions as well.

T-shaped anchors 30 may be used to attach the modules to the outer circumference of the rotor rim 32. The two sideways extending anchoring portions of the T-shaped anchor fit in a corresponding groove 16 of the permanent magnet modules and thus lock the legs 29 of the permanent magnet module in place.

The attachment of the permanent magnet modules to the rotor rim may further be seen in FIG. 6b, which represents a radial cross-section along line A-A indicated in FIG. 6a. The central rotor structure of the rotor may comprise spokes that are substantially T-shaped in radial cross-section. However, any other alternative central rotor structure supporting the rotor rim may be used.

In the embodiments illustrated in any of FIGS. 3-6, the pairs of (rows of) embedded magnets of the modules are arranged as an inverted "V". This disposition of magnets may have advantages during assembly and installation. Neighbouring modules repel each other, which may facilitate assembly. Additionally, it may be easier to magnetize the permanent magnets.

This disposition of magnets in combination with the integrated cooling channels may reduce leakage of magnetic flux.

Inclination of the magnets with respect to the corresponding local radial plane (radial plane passing through the center of the magnet) may vary. The angle of inclination with respect to the radial plane may be in the range of 0-90°, particularly in the range of 10°-50°, more particularly between 10° and 40°.

The permanent magnet modules as illustrated herein may have a length that substantially corresponds to the axial length of the electrical machine, e.g. a generator or motor; each permanent magnet module thus spans substantially the entire length of the electrical machine. In other embodiments, the length of a module may be substantially half of the axial length of the electrical machine; two permanent magnet modules span the length of the electrical machine. In these cases, one module may be inserted from the front and one module may be inserted from the rear. Similarly, in some embodiments, the anchors may span the length of the electrical machine. In other embodiments, the anchors may be divided in various segments that together span the length of the electrical machine.

In most of the embodiments illustrated herein, T-shaped anchors were used to securely fix the base of the modules to the rotor rim. In other embodiments, other anchors may be used that have a different shape that is substantially complementary to the grooves formed in the side surfaces of the base.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A permanent magnet rotor for an electrical machine having a stator and a rotor and an air gap arranged between an outer circumference of the rotor and the stator, the rotor comprising:
   a rotor body configured for rotating around a central rotational axis, and further comprising
   principal permanent magnets that are substantially rectangular in an axial cross-section and are embedded in the rotor body and are arranged inclined with respect to a radial plane extending through a center of the principal magnets and such as to have a circumferential magnetic orientation, wherein
   the principal magnets have an inner end and an outer end, the outer end of the principal magnet being arranged in the proximity of the air gap of the outer circumference of the rotor, and outer bridges of magnetically conductive material being formed between the outer ends of the principal magnets and the outer circumference of the rotor, wherein
   auxiliary magnets are arranged near the outer ends of the principal magnets to magnetically saturate the outer bridges, and wherein
   the principal magnets are made of materials having superior magnetic characteristics than the auxiliary magnets.

2. The permanent magnet rotor according to claim 1, wherein outer cooling channels are provided near the outer ends of the principal magnets.

3. The permanent magnet rotor according to claim 2, wherein the outer cooling channels are provided between the outer ends of the principal magnets and the outer bridges.

4. The permanent magnet rotor according to claim 1, wherein inner bridges of magnetically conductive material are formed between the inner ends of the principal magnets and portions of non-magnetic material, and wherein
   the auxiliary magnets are arranged near the inner ends of the principal magnets to magnetically saturate the inner bridges.

5. The permanent magnet rotor according to claim 4, wherein inner cooling channels are provided near the inner ends of the principal magnets.

6. The permanent magnet rotor according to claim 5, wherein the inner cooling channels are provided between the inner ends of the principal magnets and the portions of non-magnetic material.

7. The permanent magnet rotor according to claim 1, wherein the auxiliary magnets are smaller than the principal magnets.

8. The permanent magnet rotor according to claim 1, wherein the auxiliary magnets are made of a cheaper different material than the principal magnets.

9. The permanent magnet rotor according to claim 1, wherein the auxiliary magnets have a circumferential magnetic orientation.

10. The permanent magnet rotor according to claim 1, wherein the auxiliary magnets have a radial magnetic orientation.

11. The permanent magnet rotor according to claim 8, wherein the auxiliary magnets are made of ferrite.

12. The permanent magnet rotor according to claim 1, wherein the rotor body comprises a rim and a plurality of permanent magnet modules arranged on an outer or inner circumference of the rim, each of the permanent magnet modules extending generally along an axial direction and being of substantially constant axial-cross section, the permanent magnet modules comprising
   a base adapted to be fixed to the rotor rim, and
   one or more axial rows of the permanent magnets and rows of the auxiliary magnets, and one or more pole pieces.

13. The permanent magnet rotor according to claim 12, wherein the rim is made of a substantially non-magnetic material.

14. The permanent magnet rotor according to claim 12, further comprising a plurality of anchors for fixing the permanent magnet modules to the rotor rim, wherein
   the permanent magnet modules comprise a base having a bottom surface adapted to be fit to an inner or outer circumference of the rotor rim, and two axially extending side surfaces, and
   the two side surfaces of the base of the permanent magnet modules each comprise an axially extending groove, and wherein
   the anchors have a shape that fits in axially extending grooves of neighbouring permanent magnet modules.

15. The permanent magnet rotor according to claim 14, wherein the anchors are made of a substantially non-magnetic material.

16. The permanent magnet generator according to claim 12, wherein each of the permanent magnet modules comprises two axial rows of principle and auxiliary magnets.

17. The permanent magnet generator according to claim 12, wherein the base and pole pieces are formed by a stack of metal sheets.

18. A direct drive wind turbine comprising a generator having the rotor according to claim 1.

19. A permanent magnet rotor for an electrical machine having a stator and a rotor and an air gap arranged between the outer circumference of the rotor and the stator, the rotor comprising:
   a rotor body configured for rotating around a central rotational axis and further comprising
   principal permanent magnets that are substantially rectangular in an axial cross-section and are embedded in the rotor body and are arranged inclined with respect to a radial plane extending through a center of the principal magnets and such as to have a circumferential magnetic orientation, wherein
   the principal magnets have an inner end and an outer end, the outer end of the principal magnet being arranged in the proximity of the air gap of the outer circumference of the rotor, outer bridges of magnetically conductive material being formed between the outer ends of the principal magnets and the outer circumference of the rotor, and inner bridges of magnetically conductive material are formed between the inner ends of the principal magnets and portions of non-magnetic material, and wherein
   auxiliary magnets are arranged near the inner ends of the principal magnets to magnetically saturate the inner bridges and
   auxiliary magnets are arranged near the outer ends of the principal magnets to magnetically saturate the outer bridges.

20. The permanent magnet rotor of claim 19, wherein the auxiliary magnets are made from a cheaper material than the principal magnets.

* * * * *